United States Patent
Han

(10) Patent No.: US 11,454,819 B2
(45) Date of Patent: Sep. 27, 2022

(54) POLARIZATION CONVERSION ELEMENT AND OPTICAL ISOLATION DEVICE

(71) Applicant: LG CHEM, LTD., Seoul (KR)

(72) Inventor: Sang Choll Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 218 days.

(21) Appl. No.: 16/341,388

(22) PCT Filed: Oct. 13, 2017

(86) PCT No.: PCT/KR2017/011313
§ 371 (c)(1),
(2) Date: Apr. 11, 2019

(87) PCT Pub. No.: WO2018/070827
PCT Pub. Date: Apr. 19, 2018

(65) Prior Publication Data
US 2020/0041808 A1    Feb. 6, 2020

(30) Foreign Application Priority Data
Oct. 13, 2016  (KR) .................... 10-2016-0132841

(51) Int. Cl.
*G02B 27/28* (2006.01)
*G02B 5/30* (2006.01)
*G02F 1/1335* (2006.01)

(52) U.S. Cl.
CPC .......... *G02B 27/28* (2013.01); *G02B 5/3083* (2013.01); *G02F 1/133536* (2013.01); *G02F 1/133548* (2021.01)

(58) Field of Classification Search
CPC .... G02B 27/28; G02B 27/286; G02B 5/3083; G02B 5/30; G02B 5/3025; G02B 5/3008;
(Continued)

(56) References Cited

U.S. PATENT DOCUMENTS 4,702,603 A * 10/1987 Augustyn .......... G01B 9/02056
                                                      250/225
5,235,443 A     8/1993 Barnik et al.
(Continued)

FOREIGN PATENT DOCUMENTS

EP     0584802 A1    3/1994
JP     2-126219 A    5/1990
(Continued)

OTHER PUBLICATIONS

General Physics, The Third Edition, edited by Shouzhu Cheng & Yongzhi Jiang, p. 238-239, Published in Jun. 1980.

*Primary Examiner* — Stephone B Allen
*Assistant Examiner* — Adam W Booher
(74) *Attorney, Agent, or Firm* — Dentons US LLP

(57) ABSTRACT

The present application relates to a polarization conversion element and an optical isolation device. The present application provides a polarization conversion element capable of converting unpolarized incident light into one polarized light and an optical isolation device with an excellent optical isolation ratio comprising the polarization conversion element. Such an optical isolation device can be applied to various applications such as the field of optical communication or laser optics, the field of security or privacy protection, brightness enhancement of displays, or a use for hiding and covering.

14 Claims, 3 Drawing Sheets

(58) Field of Classification Search
CPC ... G02B 5/3016; G02B 5/32; G02F 1/133536; G02F 1/133548; G02F 1/133528; G02F 1/133543; G02F 1/13362
See application file for complete search history.

(56) References Cited

U.S. PATENT DOCUMENTS

| | | | |
|---|---|---|---|
| 5,731,886 A | 3/1998 | Taber et al. | |
| 6,557,999 B1 | 5/2003 | Shimizu | |
| 6,630,974 B2 | 10/2003 | Galabova et al. | |
| 2012/0218481 A1* | 8/2012 | Popovich | G02F 1/13342 349/11 |
| 2014/0055373 A1* | 2/2014 | Powell | G02F 1/13363 345/173 |
| 2016/0109717 A1 | 4/2016 | Teng et al. | |
| 2017/0285359 A1* | 10/2017 | Numata | G02B 30/56 |
| 2019/0033699 A1* | 1/2019 | Iigahama | G03B 21/14 |

FOREIGN PATENT DOCUMENTS

| | | |
|---|---|---|
| JP | 3-45906 A | 2/1991 |
| JP | 6-59216 A | 3/1994 |
| JP | 08-201718 A | 8/1996 |
| JP | 11-119026 A | 4/1999 |
| JP | 2002023107 A | 1/2002 |
| JP | 2003167124 A | 6/2003 |
| JP | 2003-315548 A | 11/2003 |
| JP | 2006163343 A | 6/2006 |
| JP | 2007-225905 A | 9/2007 |
| JP | 2009514039 A | 4/2009 |
| JP | 2011-107308 A | 6/2011 |
| JP | 2015-69049 A | 4/2015 |
| KR | 10-1999-004686 A | 1/1999 |
| KR | 10-2000-0050976 A | 8/2000 |
| KR | 1020020001782 A | 1/2002 |
| KR | 1020040097373 A | 11/2004 |
| KR | 10-2007-0027980 A | 3/2007 |
| KR | 1020130065265 A | 6/2013 |
| KR | 1020140148220 A | 12/2014 |

\* cited by examiner

[Figure 1 - RELATED ART]
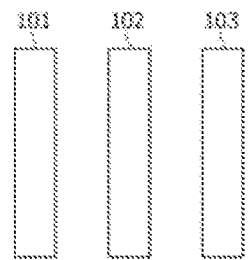
[Figure 2]
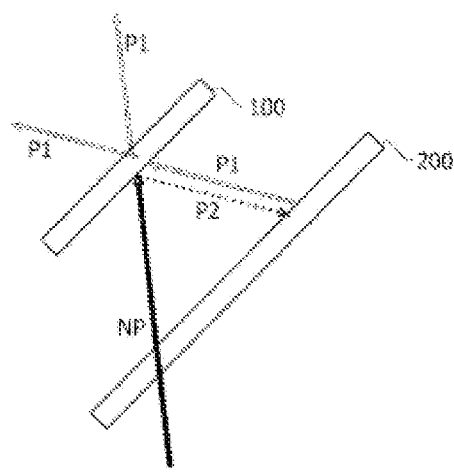

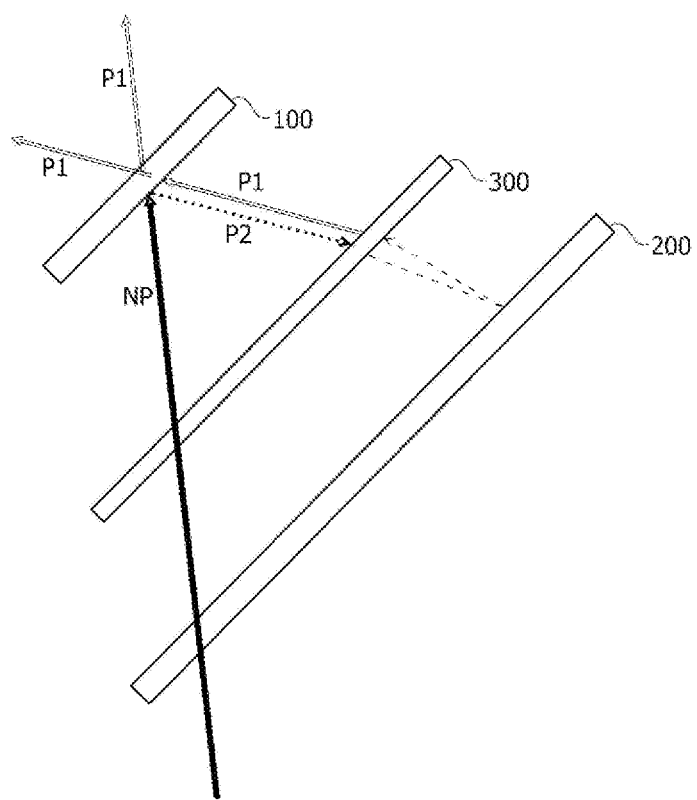
[Figure 3]

[Figure 4]
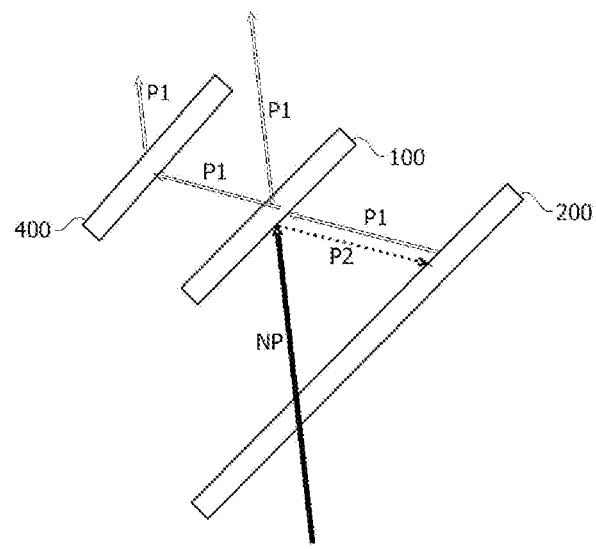
[Figure 5]
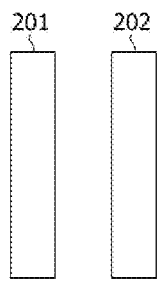
[Figure 6]
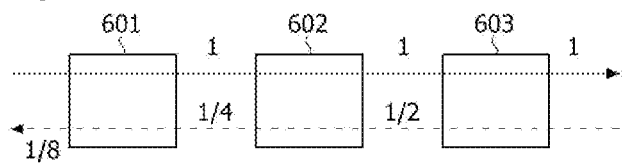

POLARIZATION CONVERSION ELEMENT AND OPTICAL ISOLATION DEVICE

TECHNICAL FIELD

This application is a National Stage Application of International Application No. PCT/KR2017/011313, filed Oct. 13, 2017, and claims the benefit of Korean Patent Application No. 10-2016-0132841, filed Oct. 13, 2016, the contents of which are incorporated herein by reference in their entirety for all purposes as if fully set forth below.

The present application relates to a polarization conversion element and an optical isolation device.

BACKGROUND ART

The optical isolation device is a device in which a forward light transmittance is higher than a backward light transmittance, which is also called an optical diode. The optical isolation device can be used to prevent unnecessary reflected light in the field of optical communication or laser optics, or it can also be applied to a building or automobile glass to be used for security or privacy protection, and the like. The optical isolation device can also be applied to applications such as brightness enhancement in various displays or military products for hiding and covering.

As the optical isolation device, there is a Faraday optical isolator using Faraday effect. The principle of the Faraday optical isolator is shown in FIG. 1. The Faraday optical isolator comprises a first polarizer (101), a Faraday rotator (102) and a second polarizer (103), where the absorption axes of the first and second polarizers (101, 103) are disposed to form 45 degrees with each other. The Faraday rotator rotates incident light linearly polarized by passing through the first polarizer by 45 degrees, whereby the incident light is transmitted through the second polarizer (forward direction). On the contrary, if the linearly polarized light transmitted through the second polarizer is equally rotated 45 degrees by the Faraday rotator, it becomes linearly polarized light parallel to the absorption axis of the first polarizer, so that it cannot be transmitted through the first polarizer (backward direction).

Since the Faraday optical isolator requires a very large external magnetic field for driving and an expensive material has to be applied thereto, it is difficult to make it large in size.

DISCLOSURE

Technical Problem

The present application relates to a polarization conversion element and an optical isolation device.

Technical Solution

In the present application, the term polarization conversion element means an element configured such that it can convert unpolarized incident light into one polarized light and exit it.

In one example, the polarization conversion element may have a transmittance of 50% or more, more than 50%, 55% or more, 60% or more, 65% or more, 70% or more, 75% or more, 80% or more, 85% or more, 90% or more, or 95% or more. The upper limit of the transmittance is not particularly limited and may be about 100%. The transmittance may be a ratio of the one polarized light transmitted through the polarization conversion element relative to unpolarized light incident on the polarization conversion element. That is, ideally, it is preferred that the polarization conversion element is configured so as to be capable of converting the incident unpolarized light into one polarized light without loss.

In this specification, the reference wavelength of optical properties such as the terms transmittance, retardation value, reflectance and refractive index can be determined according to light to be isolated by using the optical isolation device and/or light to be converted with the polarization conversion element. For example, the reference wavelength may be the wavelength of the light to be isolated and/or the light to be converted with the polarization conversion element. For example, when the optical isolation device is intended to isolate light in the visible light region, the reference wavelength of the transmittance or the like may be, for example, a value based on light having any wavelength within the range of 400 nm to 700 nm or about 550 nm; in the case of being intended to isolate light in the infrared region, the transmittance or the like may be determined based on light having a wavelength of 1,000 nm; and in the case of being intended to isolate light in the ultraviolet region, the transmittance or the like may be determined based on light having a wavelength of 250 nm.

The light transmitted through the polarization conversion element may substantially comprise only one polarized light. For example, 90% or more or 95% or more of the light transmitted through the polarization conversion element may be one polarized light. Ideally, 100% of the light transmitted through the polarization conversion element may be only the one polarized light.

Such a polarization conversion element may basically comprise at least a retroreflector and a reflective polariscope.

Here, the reflective polariscope may be an element that transmits one polarized light among the incident light including an orthogonal mode pair and reflects the other polarized light. Here, the orthogonal mode pair may comprise two linearly polarized lights whose polarization directions are perpendicular to each other or two circularly polarized lights whose rotation directions are opposite to each other. As used herein, the term vertical, horizontal, parallel or orthogonal may mean substantially vertical, horizontal, parallel or orthogonal, taking into account an error, where the error, for example, within ±10 degrees, within ±8 degrees, within ±6 degrees, within ±4 degrees, within ±2 degrees, within ±1 degree, or within ±0.5 degrees may exist. In addition, the term circularly polarized light herein is a concept including also so-called elliptically polarized light. Hereinafter, in this specification, for convenience, any one polarized light among the orthogonal mode pair may be referred to as a first polarized light and the other polarized light may be referred to as a second polarized light.

Such a reflective polariscope includes a polarizing beam splitter, a wire grid polarizer (WGP) such as a metal wire grid polarizer, a dual brightness enhancement film (DBEF) or a cholesteric liquid crystal (CLC) film, which exhibits the above effects by applying a so-called anisotropic material polarization separator or a thin film coating type polarizer. Here, the metal wire grid polarizer (WGP) and the dual brightness enhancement film (DBEF) are elements that transmit any one polarized light among the first and second polarized lights whose polarization directions are perpendicular to each other and reflect the other polarized light, and the cholesteric liquid crystal film is an element that transmits any one polarized light among the circularly polarized lights whose rotation directions are opposite to each other and reflects the other polarized light. For example, light having a desired wavelength range can be split to the orthogonal mode pair through control of the size or pitch of the grid in the metal wire grid polarizer, the laminated structure of the double brightness enhancement film, the pitch or the rotation direction of the liquid crystals in the cholesteric liquid crystal film, and the like. The type of the reflective polariscope applicable in the present application is not limited to the above, where all the reflective polariscopes known to be capable of splitting the incident light into the orthogonal mode pair of polarized lights can be applied.

Here, the retroreflector and the reflective polariscope may be located such that when the reflective polariscope transmits the first polarized light among the first and second polarized lights and reflects the second polarized light, the second polarized light may be incident on the retroreflector.

The retroreflector is a known element and thus an element that reflects the light incident on the retroreflector in a direction parallel to the incident direction. Therefore, the second polarized light reflected by the reflective polariscope and incident on the reflector is reflected and incident on the reflective polariscope again. Such a retroreflector is variously known, and in the present application, it is possible to select and use an appropriate one among these known retroreflectors. As the retroreflector, for example, a holographic film or a reflective oblique louver film, and the like can be used.

The polarization conversion element of the present application may be configured such that when the second polarized light reflected by the retroreflector is incident on the reflective polariscope again, the polarization state can be converted into the first polarized light. With such a configuration, all the incident unpolarized lights theoretically can be converted into the first polarized state and transmitted through the reflective polariscope.

It can be assumed that the optically unpolarized light comprises an orthogonal mode pair, that is, two linearly polarized lights whose polarization directions are perpendicular to each other, or two circularly polarized lights whose rotation directions are opposite to each other. Thus, the first polarized light, which is about 50% of the unpolarized light incident on the first reflective polariscope, is transmitted through the reflective polariscope and the second polarized light, which is the other 50%, is reflected and incident on the retroreflector, and the incident second polarized light is reflected by the retroreflector and then is incident on the reflective polariscope in a state of being the first polarized light, so that 100% of the unpolarized light can be theoretically transmitted through the reflective polariscope in the first polarized light state.

Here, the method of converting the second polarized light reflected by the reflective polariscope to the first polarized light while passing through the retroreflector is not particularly limited.

In one aspect, the retroreflector itself can serve to convert the second polarized light as above into the first polarized light. That is, when any one polarized light of the optically orthogonal mode pair of polarized lights is reflected at a reflection surface, the reflected polarized light may be changed to the other orthogonal mode pair of the polarized light before the corresponding reflection to be reflected. For example, when the right-handed circularly polarized light that is rotating in the counterclockwise direction is reflected at the reflection surface, the reflected polarized light may be converted into left-handed circularly polarized light that rotates clockwise, and conversely, when the left-handed circularly polarized light is reflected at the reflection surface, it may be converted into right-handed circularly polarized light. Therefore, in this case, the second polarized light reflected by the retroreflector can be converted into the first polarized light that can be transmitted through the reflective polariscope.

As explaining this case with reference to drawings, if unpolarized light (NP) is incident on the reflective polariscope (100) as in FIG. 2, only the first polarized light (P1) of the unpolarized light (NP) is transmitted through the reflective polariscope (100), and the second polarized light (P2) is reflected by the polariscope (100). Here, if the reflective polariscope (100) is, for example, the above-described cholesteric liquid crystal film, the reflected second polarized light (P2) may be right-handed circularly polarized light or left-handed circularly polarized light. When the reflected second polarized light (P2) is incident on the retroreflector (200), the second polarized light (P2) after reflection is again converted into the first polarized light (P1) and the converted first polarized light (P1) may be transmitted through the reflective polariscope (100), so that the unpolarized light (NP) may be all converted into the first polarized light (P1). FIG. 2 shows a case where the unpolarized light (NP) is transmitted through the retroreflector (200) and then incident on the reflective polariscope (100), but the unpolarized light (NP) may be incident on the reflective polariscope (100) without passing through the retroreflector (200). The case as in FIG. 2 is a case where the retroreflector (200) is a reflector that transmits light incident at a predetermined angle and reflects light incident at different angles, and for example, a reflective oblique louver film or the like is used.

In one aspect, a retarder may be applied so that the light reflected from the retroreflector can be converted into the first polarized light that can be transmitted through the reflective polariscope. It is possible to convert the second polarized light into the first polarized light through application of an appropriate retarder.

As the retarder, a λ/2 plate or a λ/4 plate may be applied. The term λ/2 plate is a retarder referred to as a so-called HWP (half wave plate), which is an element that when linearly polarized light is incident, the polarization direction of the linearly polarized light can be rotated by approximate 90 degrees, and the term λ/4 plate is a retarder referred to as a so-called QWP (quarter wave plate), which is an element capable of converting linearly polarized light and circularly polarized light to each other. Retarders that can act as the λ/2 plate or λ/4 plate are variously known in this field. For example, the retarder may be a polymer stretched film or a liquid crystal polymer film. As the polymer stretched film, for example, an acrylic film, a polyolefin film such as a polyethylene film or a polypropylene film, a cycloolefin polymer (COP) film such as a polynorbornene film, a polyvinyl chloride film, a polyacrylonitrile film, a polysulfone film, a polyvinyl alcohol film or a cellulose ester polymer film such as a TAC (triacetyl cellulose) film, or a copolymer film of two or more monomers among monomers forming the polymer, and the like may be exemplified. The retarder may be formed by appropriately stretching such a film by a method known in this field. In addition, as the liquid crystal polymer film, a film obtained by orienting and polymerizing a known liquid crystal film such as a nematic liquid crystal or a discotic liquid crystal may be exemplified.

Retarders that can act as the λ/2 plate or λ/4 plate in this field are known and such films may be used without limitation in the present application.

When the retarder is applied, the retarder may be located between light paths of the second polarized light reflected to the retroreflector by the reflective polariscope. An example of such a case is shown in FIG. 3.

FIG. 3 may be an example of the case where the reflective polariscope (100) is the polarizing beam splitter (PBS), the metal wire grid polarizer or the double brightness enhancement film as described above. In this case, the first and second polarized lights may be linearly polarized lights whose polarization directions are perpendicular to each other. The example of FIG. 3 further comprises a retarder (300), wherein the retarder (300) is located between light paths of the second polarized light (P2) reflected to the retroreflector (200) side by the reflective polariscope (100). At this time, the retarder (300) may be a λ/4 plate. As confirmed from the drawing, the second polarized light (P2) reflected by the reflective polariscope (100) is first incident on the retarder (300), thereby being converted into any one polarized light of left-handed circularly and right-handed circularly polarized lights. When the polarized light thus converted is incident on the retroreflector (200), the reflected polarized light becomes polarized light whose rotation direction is reversed, and when the polarized light is incident on the retarder (300) again, it is converted into the first polarized light (P1) whose polarization direction is perpendicular to the second polarized light (P2), whereby it can be transmitted through the reflective polariscope (100). The case of FIG. 3 also shows a case where unpolarized light (NP) is incident on the reflective polariscope (100) after being transmitted through the retroreflector (200) and the retarder (300), but the unpolarized light (NP) can also be incident on the reflective polariscope (100) without passing through the retroreflector (200) and the retarder (300). Furthermore, since the incident light (NP) is unpolarized light, the polarization state is not affected even when the light passes through the retarder (300).

The polarization conversion element may also comprise, as an additional configuration, a retarder disposed at a position where the first polarized light transmitted through the reflective polariscope can be incident. Such a retarder may be required in order that when the first polarized light (P1) finally transmitted through the reflective polariscope (100) is any one polarized light of right-handed circularly polarized light and left-handed circularly polarized light as in the example of FIG. 2, such a polarized light is converted into linearly polarized light. The retarder may be a λ/4 plate, whereby finally linearly polarized light can be generated.

When the polarization conversion element further comprises the retarder as above, the optical axis of the relevant retarder can be controlled according to the light incident on the retarder so that the contained retarder can perform a proper role.

The polarization conversion element may further comprise one or more light-path controllers (400) for controlling a path of light, where such a light-path controller (400) may be exemplified by a prism, a reflective plate, or the like. Such a light-path controller can be used, for example, as a use for matching the traveling direction of polarized light transmitted through the reflective polariscope. For example, as shown in FIG. 4, the first polarized light transmitted through the reflective polariscope (100) may comprise two polarized lights having different traveling directions from each other, where the light-path controller (400) may be located at a proper position so that the traveling directions of the two first polarized lights can be matched. In such a case, the controller (400) may be formed so as to match the paths of two or more lights having different light paths from each other as two or more lights transmitted through the reflective polariscope (100).

The polarization conversion element may comprise additional necessary configurations in addition to the above configurations. Such a configuration may be exemplified by a light-path controller capable of controlling the light path of unpolarized light so as to be properly incident on the reflective polariscope, or the like. For example, in the above case, the light-path controller may be formed such that unpolarized incident light may enter the reflective polariscope at an angle greater than 0 degrees and less than 90 degrees.

The present application also relates to an optical isolation device. The term optical isolation device may mean a device configured such that the transmittance of light incident in either direction is relatively greater than the transmittance of light incident in the opposite direction. In the optical isolation device, the direction having a large transmittance of incident light can be referred to as a forward direction, and the opposite direction can be referred to as a backward direction. Here, the forward direction and the backward direction may form an angle of approximate 160 degrees to 200 degrees with each other, but is not limited thereto.

In the optical isolation device, the ratio of the transmittance of the light incident in the forward direction and the transmittance of the light incident in the backward direction can be about 3 dB or more, by the isolation ratio (IR) depending on Equation 1 below. The upper limit of the isolation ratio is not particularly limited because it shows that the higher the numerical value is, the better the optical isolation effect. In one example, the isolation ratio may be about 10 dB or less, about 9.5 dB or less, about 9 dB or less, about 8.5 dB or less, about 8 dB or less, about 7.5 dB or less, about 7 dB or less, about 6.5 dB or less, about 6 dB or less, about 5.5 dB or less, about 5 dB or less, about 4.5 dB or less, or about 4 dB or less.

$$IR = 10 \times n \times \log(F/B) \qquad \text{[Equation 1]}$$

In Equation 1, IR is an isolation ratio, n is a number of optical isolation elements, which are described below, included in the optical isolation device, F (forward direction) is a transmittance of light incident on the optical isolation device in the forward direction, and B (backward direction) is a transmittance of light incident on the optical isolation device in the backward direction.

The transmittance of light incident in the forward direction of the optical isolation device may be about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance of light incident in the backward direction of the optical isolation device may be less than about 50%, about 45% or less, about 40% or less, about 35% or less, about 30% or less, about 25% or less, about 20% or less, about 15% or less, about 10% or less, or about 5% or less. The lower limit of the backward transmittance may be about 0%.

The optical isolation device may comprise at least one or more optical isolation elements. The term optical isolation element is a unit element forming an optical isolation device, which has an optical isolation function alone. Accordingly, the optical isolation element is also configured such that the transmittance of the light incident in the forward direction is relatively larger than the transmittance of the light incident in the backward direction, where the range of the isolation ratio, forward transmittance and backward transmittance can be applied equally by the contents mentioned in the optical isolation device.

The optical isolation element may comprise the polarization conversion element and the polarizer. As schematically shown in FIG. 5, the polarization conversion element (201) and the polarizer (202) may be located such that light incident on the side of the polarization conversion element (201) can be transmitted through the element (201) and then face to the polarizer (202). In this specification, the direction facing from the polarization conversion element (201) to the polarizer (202) may be referred to as the forward direction, and the direction toward the polarizer (202) and the polarization conversion element (201) may be referred to as the backward direction.

As described above, the polarization conversion element is configured such that it can convert unpolarized light incident in a first direction into linearly polarized light and exit it to a second direction. That is, referring to the description of the polarization conversion element, the first and second directions may be parallel to the direction where the unpolarized light is incident on the reflective polariscope and/or the traveling direction of the first polarized light finally transmitted through the reflective polariscope. Here, the linearly polarized light exited in the second direction may be one linearly polarized light. That is, the linearly polarized light exited to the second direction may not comprise two or more linearly polarized lights having different polarization directions from each other. The first and second directions may be directions approximately parallel to the forward direction.

The optical isolation element comprises a polarizer together with the above-described polarization conversion element, where the polarizer is disposed at a position where the linearly polarized light traveling in a forward direction and transmitted through the optical isolation element can enter. As the polarizer, for example, an absorbing linear polarizer can be used. The absorbing linear polarizers are variously known in the art and, for example, so-called PVA (polyvinyl alcohol) polarizers can be used. This absorbing polarizer has a transmission axis formed in one direction and an absorption axis formed in a direction perpendicular to the transmission axis, where the polarizer may be disposed such that the transmission axis is parallel to the polarization direction of the linearly polarized light generated by being transmitted through the polarization conversion element. In such a case, the light that is incident in the forward direction and is transmitted through the polarization conversion element can theoretically be transmitted 100%, and at least 50% of the light transmitted in the backward direction is absorbed and blocked by the absorbing linear polarizer.

The optical isolation element may further comprise a phase delay plate. Here, the phase delay plate is an optical element having the same concept as the above-described retarder, but in the present application, it is referred to as a phase delay plate in order to distinguish it from the retarder included in the polarization conversion element. The phase delay plate may be located at a position where light traveling in a forward direction enters after being transmitted through the polarizer. Such a phase delay plate can solve a problem that may occur as the light once transmitted through the optical isolation element in the forward direction travels toward the optical isolation element again by reflection or the like. That is, the light reflected due to the presence of the phase delay plate will be converted into linearly polarized light parallel to the absorption axis of the absorbing polarizer, thereby being absorbed back to the polarizer.

In this case, the above-described λ/4 plate may be used as the phase delay plate. The specific types of the λ/4 plate are as described above.

In this case, the phase delay plate may be disposed such that its optical axis (e.g., slow axis) forms an angle in a range of about 40 degrees to 50 degrees, for example, about 45 degrees, or in a range of 130 degrees to 140 degrees, for example, about 135 degrees, with the transmission axis of the absorbing polarizer.

The optical isolation element may further comprise, if necessary, a light-path controller, such as a prism or a reflective plate, which can additionally control the light path, in addition to those included in the above-described polarization conversion element.

The optical isolation device may comprise one or two or more optical isolation elements as above. When two or more optical isolation elements are included, each of the optical isolation elements may be disposed so that the light transmitted through any one optical isolation element along the forward direction may enter the side of the polarization conversion element of the other optical isolation element. By applying a plurality of optical isolation elements as above, the optical isolation ratio can be more improved. For example, referring to FIG. 6, theoretically, light transmitted through a number of optical isolation elements 601, 602 and 603 in the forward direction continues to be transmitted without loss, but in the case of light transmitted in the backward direction, it continues to be reduced by an exponent of ½. Therefore, by controlling the number of the optical isolation elements, it is possible to maximize the optical isolation ratio.

Advantageous Effects

The present application provides a polarization conversion element capable of converting unpolarized incident light into one polarized light and an optical isolation device with an excellent optical isolation ratio comprising the polarization conversion element. Such an optical isolation device can be applied to various applications such as the field of optical communication or laser optics, the field of security or privacy protection, brightness enhancement of displays, or a use for hiding and covering.

BRIEF DESCRIPTION OF DRAWINGS

FIG. 1 is a diagram schematically showing a Faraday optical isolator.

FIGS. 2 to 4 are schematic diagrams of polarization conversion elements of the present application.

FIG. 5 is a diagram showing a basic configuration of an optical isolation element of the present application.

FIG. 6 is a diagram schematically showing a case where a number of optical isolation elements are included.

MODE FOR INVENTION

Hereinafter, the present application will be described in detail with reference to the following examples and comparative examples, but the scope of the present application is not limited to the following examples.

Example 1

An element of the type as in FIG. 3 was manufactured and its performance was tested. In this process, a wire grid polarizer was used as the reflective polariscope (100), a reflective oblique louver film was applied as the retroreflector (200), and a product (WPQ05M-532) from Thorlabs was used as the retarder (300). A Genesis MX SLM laser from Coherent Inc. was incident on the element as above (power 10 mW) to test the element. The forward transmittance obtained in this manner was about 76%, the backward transmittance was about 36%, and the isolation ratio (IR) was about 3.2 dB.

The invention claimed is:

1. An optical isolation device comprising at least one optical isolation element,
wherein the optical isolation element comprises a polarizer and a polarization conversion element for converting unpolarized incident light into one polarized light exiting the polarization conversion element,
wherein the polarizer is an absorbing linear polarizer,
wherein the polarization conversion element comprises a retroreflector, a retarder and a reflective polariscope,
wherein the unpolarized incident light comprises a vertical mode pair of a first polarized light and a second polarized light,
wherein the first polarized light is transmitted through the reflective polariscope and the second polarized light is reflected by the reflective polariscope,
wherein the second polarized light reflected by the reflective polariscope is incident on the retroreflector, and
wherein the retroreflector and the reflective polariscope are disposed such that the unpolarized incident light comprising the vertical mode pair is incident on the reflective polariscope and the second polarized light is reflected by the reflective polariscope to the retroreflector,
wherein the polarization conversion element has a transmittance of 60% or more, the transmittance being a ratio of the one polarized light exiting the polarization conversion element relative to the unpolarized incident light, and
wherein the retarder is positioned between the retroreflector and the reflective polariscope such that the second polarized light reflected by the reflective polariscope is incident on the retroreflector after passing through the retarder.

2. The optical isolation device according to claim 1, wherein the one polarized light is linearly polarized light.

3. The optical isolation device according to claim 1, wherein the reflective polariscope is a polarizing beam splitter, a wire grid polarizer, a double brightness enhancement film or a cholesteric liquid crystal film.

4. The optical isolation device according to claim 1, wherein the retarder is disposed such that the unpolarized light comprising the vertical pair is incident on the reflective polariscope without passing through the retarder.

5. The optical isolation device according to claim 4, wherein the retarder is a $\lambda/4$ plate.

6. The optical isolation device according to claim 1, wherein the reflective polariscope is a cholesteric liquid crystal film.

7. An optical isolation device comprising at least one optical isolation element,
wherein the optical isolation element comprises a polarizer and a polarization conversion element for converting unpolarized incident light into one polarized light exiting the polarization conversion element,
wherein the polarizer is an absorbing linear polarizer,
wherein the polarization conversion element and the polarizer are sequentially disposed,
wherein the polarization conversion element comprises a retroreflector and a reflective polariscope,
wherein the unpolarized incident light comprises a vertical mode pair of a first polarized light and a second polarized light,
wherein the first polarized light is transmitted through the reflective polariscope and the second polarized light is reflected by the reflective polariscope,
wherein the second polarized light reflected by the reflective polariscope is incident on the retroreflector,
wherein the polarization conversion element further comprises a retarder at a position where the first polarized light transmitted through the reflective polariscope can be incident,
wherein the reflective polariscope is a cholesteric liquid crystal film, and
wherein the polarization conversion element has a transmittance of 60% or more, the transmittance being a ratio of the one polarized light exiting the polarization conversion element relative to the unpolarized incident light.

8. The optical isolation device according to claim 7, wherein the retarder is a $\lambda/4$ plate.

9. An optical isolation device, comprising at least two optical isolation elements,
wherein each of the optical isolation elements comprises a polarizer and a polarization conversion element for converting unpolarized incident light into one polarized light exiting the polarization conversion element, the polarization conversion element and the polarizer being sequentially disposed,
wherein the polarization conversion element comprises a retroreflector and a reflective polariscope,
wherein the unpolarized incident light comprises a vertical mode pair of a first polarized light and a second polarized light,
wherein the first polarized light is transmitted through the reflective polariscope and the second polarized light is reflected by the reflective polariscope,
wherein the second polarized light reflected by the reflective polariscope is incident on the retroreflector and
wherein the optical isolation elements are disposed so that light transmitted through a first of the at least two optical isolation elements can enter a side of the polarization conversion element of a second of the at least two optical isolation elements.

10. The optical isolation device according to claim 9, wherein the polarization conversion element generates one linearly polarized light.

11. The optical isolation device according to claim 10, wherein the polarizer is an absorbing linear polarizer having a transmission axis formed in one direction and an absorption axis formed in a direction perpendicular to the transmission axis, and the polarizer is disposed such that the transmission axis is formed in a direction parallel to the linearly polarized light.

12. The optical isolation device according to claim 9, further comprising a phase delay plate at a position where light generated in the polarization conversion element and transmitted through the polarizer can enter.

13. The optical isolation device according to claim 12, wherein the phase delay plate is disposed such that its slow axis forms an angle in a range of 40 degrees to 50 degrees or an angle in a range of 130 degrees to 140 degrees with the transmission axis of the polarizer.

14. The optical isolation device according to claim 12, wherein the phase delay plate is $\lambda/4$ plate.

* * * * *